Oct. 18, 1927.

E. R. DEXTER

TIRE FLAP

Filed Dec. 14, 1926

1,646,191

Inventor
Edward R. Dexter
By his Attorneys
Cooper, Kerr & Dunham

Patented Oct. 18, 1927.

1,646,191

UNITED STATES PATENT OFFICE.

EDWARD R. DEXTER, OF GOSHEN, NEW YORK.

TIRE FLAP.

Application filed December 14, 1926. Serial No. 154,670.

This invention relates to improvements in tire flaps, and more particularly to adjustable flaps which are suitable for use in different commercial sized tires. According to the present invention the flap is not only adjustable for use with different commercial sizes of tires, but it is also self adjustable for various inflating conditions and such adjustment takes place without chafing the tube or otherwise damaging it. The use of embracing loops around the flap parts is obviated and an adjusting connection is employed which operates with the minimum of freedom and at a point remote from the valve of the inner tube.

Figure 1:
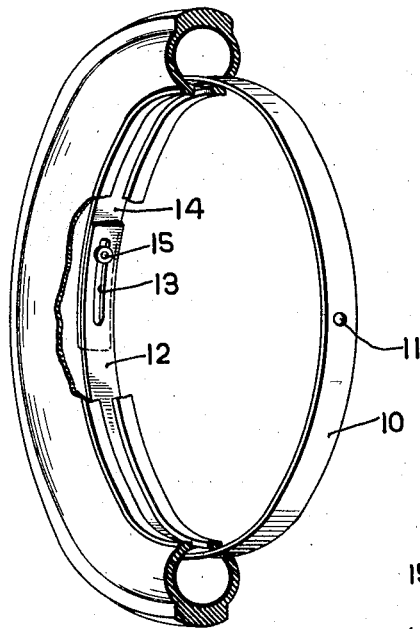
Fig. 1 is a perspective part sectional view of my improved flap in place in a tire casing.
Figure 2:
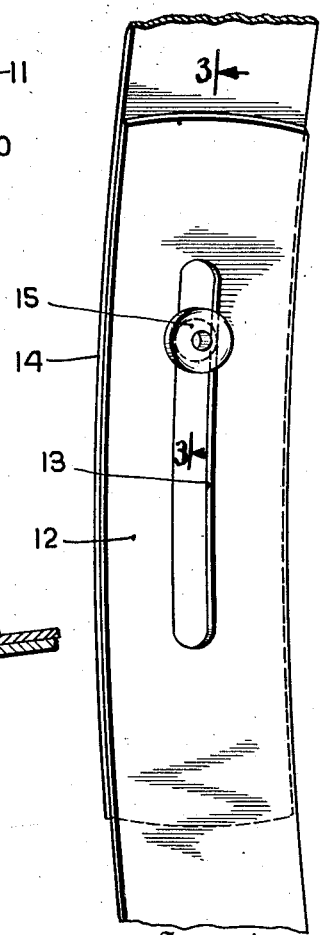
Fig. 2 is an enlarged interior perspective view of the adjustable portion of the flap.

In more detail, the flap is made of a strip 10 of suitable fabric, with a hole 11 to receive the valve of the inner tube. This hole is disposed substantially at a mid point intermediate the ends of the flap. One end 12 is slotted as shown at 13 and the length of the slot is sufficient to afford adjustment of the circumferential dimension of the flap for varying commercial sizes of tires. The other overlapping cooperating end 14 of the flap carries a sliding connecting member or device generally designated 15.

Figure 3:
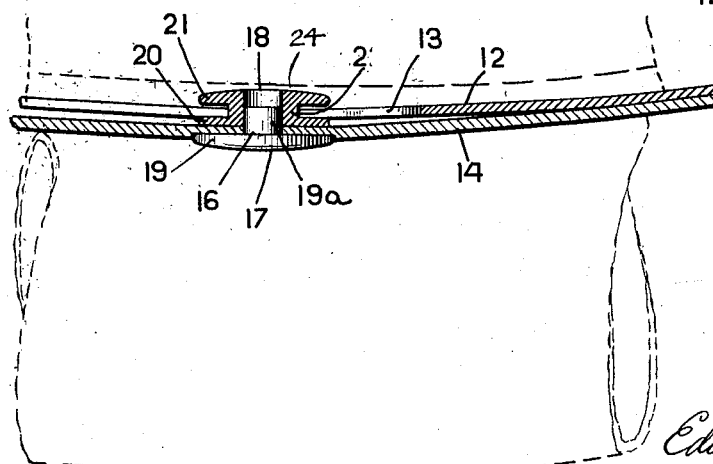
Fig. 3 is a detail sectional view taken on line 3—3 of Fig. 2.

The intermediate connection comprises a member 16 preferably slightly curved on one surface as at 17 and having suitably connected therewith a roller member 18. Connection of the parts may be made in various ways, but preferably 16 is provided with a stud or shank 19ª which extends into an opening in part 18 and is secured therein by a press fit. Any other means may be employed for securing the parts together or they can be made unitary if the dimension of the flange 19 be diminished somewhat to permit it being forced through the fabric of the strip. The two-part construction is, however, preferable. Preferably the flange portion 19 is slightly sunk into the surface of the fabric, as shown in Fig. 3. The member 18 is preferably provided with collars or flanged portions 20 and 21, respectively. The shank portion 22 extends through the slot 13 with a free sliding fit, and the flange portion 20 extends under the flap material of the end 12 (Fig. 3) adjacent the slot 13 and the flanged portion 21 extends over the material of end 12 (see also Fig. 3). Suitable clearances are provided so that the ends 12 and 14 are freely adjustable one to the other.

As shown in Fig. 3, the flanged portion 20 also overlies the material of the end 14 and the material is preferably firmly clamped between the flanged portion 20 and flange 19. While the flanged portion 20 is not absolutely essential, it is preferable to employ it as it not only reduces the friction in the adjusting connection, but also aids in keeping the part 16 tightly clamped against the fabric of end 14. The terms over and under are here referred to in connection with Fig. 3. "Over" means beyond the upper edge of the flap material of end 12 in referring to the flanged portion 21 in Fig. 3.

It will be understood that the flap can be sold either in assembeld condition with the connection 15 engaged in the slot 13, or the user may himself assemble the part 15 in the opposite end 12 of the flap. The flexibility of the strip 10 will permit such assembly and engagement of the flanged portions 20 and 21 under and over the material of end 12 adjacent slot 13.

When in use the overlapped end 14 will prevent blowing out of the inner tube 23 through the slot. It is of sufficient length to always cover the slot irespective of the positoin of the slip connection. The part 18 is in contact with the rim as indicated at 24, and may be rounded as shown to facilitate sliding action.

The above flap will be adaptable for different commercial sizes of tires, and furthermore the construction affords free relative adjustability of the ends during inflation. The adjustment takes place at a point remote from the valve stem and accordingly the valve stem does not become displaced or rocked during inflation of the tube or when in use. The tension acting upon the valve stem is at all time equal and opposite. Any strain tending to cause variations in the circumferential size of the flap will automatically bring about a relative adjustment of the remote ends 12 and 14 of the flap, and such displacement is not impeded by embracing straps and the like as heretofore.

What I claim is:

1. An adjustable tire flap perforated substantially inntermediate the end to receive a valve stem and having one end slotted and the other end provided with a device adapted to pass through the slot, said device provided with flanged portions to extend over and under the material of the last mentioned end of the flap adjacent the slot therein.

2. An adjustable tire flap perforated to receive a valve stem and provided with relatively adjustable cooperating ends, one end being slotted and the other end including a connecting device remote from the valve stem and carried by said end and projecting through said slot in the last mentioned end and having portions engaging over the material of the said end at the sides of said slot for the purpose described.

3. An adjustable tire flap perforated to receive a valve stem at a point substantially intermediate the ends thereof, one end of said flap having an extended slot to afford adjustability of the circumferential dimension of the complete flap to permit the flap to be used with various commercial sizes of tires, the other end of said flap having fixedly connected thereto a member embracing both sides of said end and having a portion thereof adapted to extend through the slot in the other end and to overlap the material of said other slotted end, thereby affording a freely slidable adjustable connection.

In testimony whereof I hereto affix my signature.

EDWARD R. DEXTER.